US007676360B2

(12) United States Patent
Ghanekar et al.

(10) Patent No.: US 7,676,360 B2
(45) Date of Patent: Mar. 9, 2010

(54) METHOD FOR SCALE-FACTOR ESTIMATION IN AN AUDIO ENCODER

(75) Inventors: Sachin Ghanekar, Maharashtra (IN); Ravindra Chaugule, Maharashtra (IN)

(73) Assignee: Sasken Communication Technologies Ltd., Karnataka (IN)

( * ) Notice: Subject to any disclaimer, the term of this patent is extended or adjusted under 35 U.S.C. 154(b) by 1050 days.

(21) Appl. No.: 11/361,803

(22) Filed: Feb. 24, 2006

(65) Prior Publication Data

US 2007/0129939 A1 Jun. 7, 2007

(30) Foreign Application Priority Data

Dec. 1, 2005 (IN) ........................ 1758/CHE/2005

(51) Int. Cl.
*G10L 19/02* (2006.01)
*G06F 17/14* (2006.01)

(52) U.S. Cl. ........................ 704/205; 704/501; 708/208; 708/403

(58) Field of Classification Search ................. 704/200, 704/200.1, 201, 203, 205, 206, 224, 500, 704/501; 381/94.3; 708/308, 402, 405, 208, 708/403
See application file for complete search history.

(56) References Cited

U.S. PATENT DOCUMENTS 5,065,431 A * 11/1991 Rollett ........................ 704/243
5,774,844 A * 6/1998 Akagiri ........................ 704/230
5,890,125 A * 3/1999 Davis et al. ................. 704/501
6,098,039 A 8/2000 Nishida
6,308,150 B1 * 10/2001 Neo et al. ................ 704/200.1
6,339,757 B1 * 1/2002 Teh et al. ..................... 704/219
6,678,648 B1 1/2004 Surucu
6,718,019 B1 * 4/2004 Heidari et al. ........... 379/93.05
6,732,071 B2 5/2004 Lopez-Estrada et al.
6,745,162 B1 6/2004 Hu
6,850,616 B2 * 2/2005 Soman et al. ............... 379/386
7,072,477 B1 * 7/2006 Kincaid ....................... 381/107
7,315,822 B2 * 1/2008 Li .............................. 704/500
7,318,035 B2 * 1/2008 Andersen et al. ............ 704/500
7,353,169 B1 * 4/2008 Goodwin et al. ............ 704/224
7,472,152 B1 * 12/2008 Tsui et al. ................... 708/403
2002/0120442 A1 * 8/2002 Hotta .......................... 704/229
2004/0015525 A1 * 1/2004 Martens et al. ............. 708/208
2004/0162720 A1 8/2004 Jang et al.
2008/0027709 A1 * 1/2008 Baumgarte ............... 704/200.1
2008/0031463 A1 * 2/2008 Davis .......................... 381/17
2008/0250090 A1 * 10/2008 Eitel .......................... 708/201

* cited by examiner

*Primary Examiner*—Martin Lerner
(74) *Attorney, Agent, or Firm*—Rahman LLC

(57) ABSTRACT

A method, system and computer program product for computationally efficient estimation of the scale factors of one or more frequency bands in an encoder. These scale factors are dependant on a plurality of variables. One of the variables is approximated according to embodiments of the invention. This reduces the complexity of the estimation of scale factors, especially in digital signal processors.

20 Claims, 5 Drawing Sheets

| Table 1 | | |
|---|---|---|
| Test stream | ODG_ref | ODG_new |
| guitar | -1.71 | -1.42 |
| Casta | -2.02 | -1.49 |
| song1 | -1.74 | -1.56 |
| harp | -0.76 | -0.82 |
| song3 | -1.29 | -1.28 |
| song4 | -1.05 | -1.02 |
| violin | -0.82 | -0.89 |
| Guitar_drums | -1.59 | -1.50 |
| mixed | -0.85 | -0.77 |
| Male_voice | -0.80 | -0.74 |
| Female_voice | -0.99 | -0.86 |
| bells | -1.68 | -1.16 |
| song5 | -0.80 | -0.80 |

| Table 2 | | |
|---|---|---|
| Test stream | ODG_ref | ODG_new |
| guitar | -1.87 | -1.65 |
| casta | -2.00 | -1.65 |
| song1 | -1.64 | -1.61 |
| harp | -0.78 | -0.84 |
| song3 | -1.44 | -1.50 |
| song4 | -1.09 | -1.08 |
| violin | -0.84 | -0.88 |
| Guitar_drums | -1.81 | -1.78 |
| mixed | -3.61 | -1.46 |
| male_voice | -1.34 | -1.32 |
| Female_voice | -2.11 | -1.87 |
| bells | -1.50 | -1.17 |
| song5 | -1.03 | -1.00 |

FIG. 5

METHOD FOR SCALE-FACTOR ESTIMATION IN AN AUDIO ENCODER

BACKGROUND

The invention relates to signal-processing systems. More specifically, the invention relates to audio encoders.

The use of digital audio has become widespread in audio and audio-visual systems. Therefore, the demand for more effective and efficient digital audio systems has increased, so that the same memory can be used to store more audio files. Further, an efficient digital audio system enables the same bandwidth to be used for transferring additional audio files. Therefore, system designers, as well as manufacturers, are striving to improve audio data-compression systems.

In conventional systems, perceptive encoding is mostly used for compression of audio signals. In any given situation, the human ear is capable of hearing only certain frequencies within the audible frequency band. This is taken into account in a psycho-acoustic model. This model takes the effects of simultaneous and temporal masking into account to define a masking threshold at different frequency levels. The masking threshold is defined as the minimum level of the particular frequency at which the human ear can hear. Therefore, the model helps an encoder to improve data compression by defining the frequencies that will not be heard by the human ear, so that the encoder can ignore these frequencies during bit allocation.

In a conventional encoder, an inner iteration loop or a rate control loop is carried out. In this loop, the quantization step is varied to match the number of bits available with the demand for bits generated by the coding employed. If the number of bits required by the frequencies selected by the psycho-acoustic model is more than the number of bits available, the quantization step is varied.

Further, the frequency spectrum of the input signal is divided into a number of frequency bands, and a scale factor is calculated for each of the frequency bands. Scale factors are calculated to shape the quantization noise according to the masking threshold. If the quantization noise of any band is above the masking threshold, the scale factor is adjusted to reduce the quantization noise. This iterative process of selecting the scale factors is known as the outer iteration loop or the distortion control loop.

An encoder generally performs various calculations, including the calculation of scale factors. However, the known methods for calculating scale factors are complex and computationally inefficient, which make the overall encoding process time-consuming.

Thus, there is a need for a computationally efficient method for calculation of scale factors.

SUMMARY

An object of the invention is to provide a computationally efficient method and system for an estimation of the scale factors in an encoder.

Another object of the invention is to enable efficient calculation of scale factors in a Digital Signal Processor (DSP).

Embodiments of the invention provide a method and a system for computationally efficient estimation of scale factors in an encoder. In the encoder, the input signals are transformed using a Fourier transform. A first variable is defined as the summation of the square root of coefficients of the transform. According to embodiments of the invention, the value of the first variable is approximated. The approximated first variable is then used to calculate the value of the scale factors of the different frequency bands.

According to an embodiment of the invention, the first variable is approximated as the square root of the summation of the coefficients of the transform. This approximated value is used to calculate the value of the scale factors.

According to another embodiment of the invention, the approximated value of the first variable is used to calculate the ratio between the cube root of the square of the first variable and the cube root of the square of the product of the bandwidth and the masking level of each of the frequency bands. Then, the ratio having the minimum value of the first variable is selected. The value of the scale factor for any frequency band is calculated by using the value of the ratio for the particular frequency band and the selected ratio.

BRIEF DESCRIPTION OF THE DRAWINGS

The preferred embodiments of the invention will hereinafter be described in conjunction with the appended drawings, provided to illustrate and not to limit the invention, wherein like designations denote like elements, and in which:

FIG. 5 is a comparison of Objective Difference Guide (ODG) results of the different output signals produced by a conventional encoder, and those produced by an encoder implementing an embodiment of the invention for various input signals, in accordance with an embodiment of the invention.

DESCRIPTION OF PREFERRED EMBODIMENTS

The invention relates to a method and a system for the calculation of scale factors in an audio encoder. The scale factors depend on a first variable. The value of the first variable is approximated. The computational complexity of the variable is reduced by this approximation. After this, the approximated first variable is used to calculate the values of the scale factors.

Figure 1:
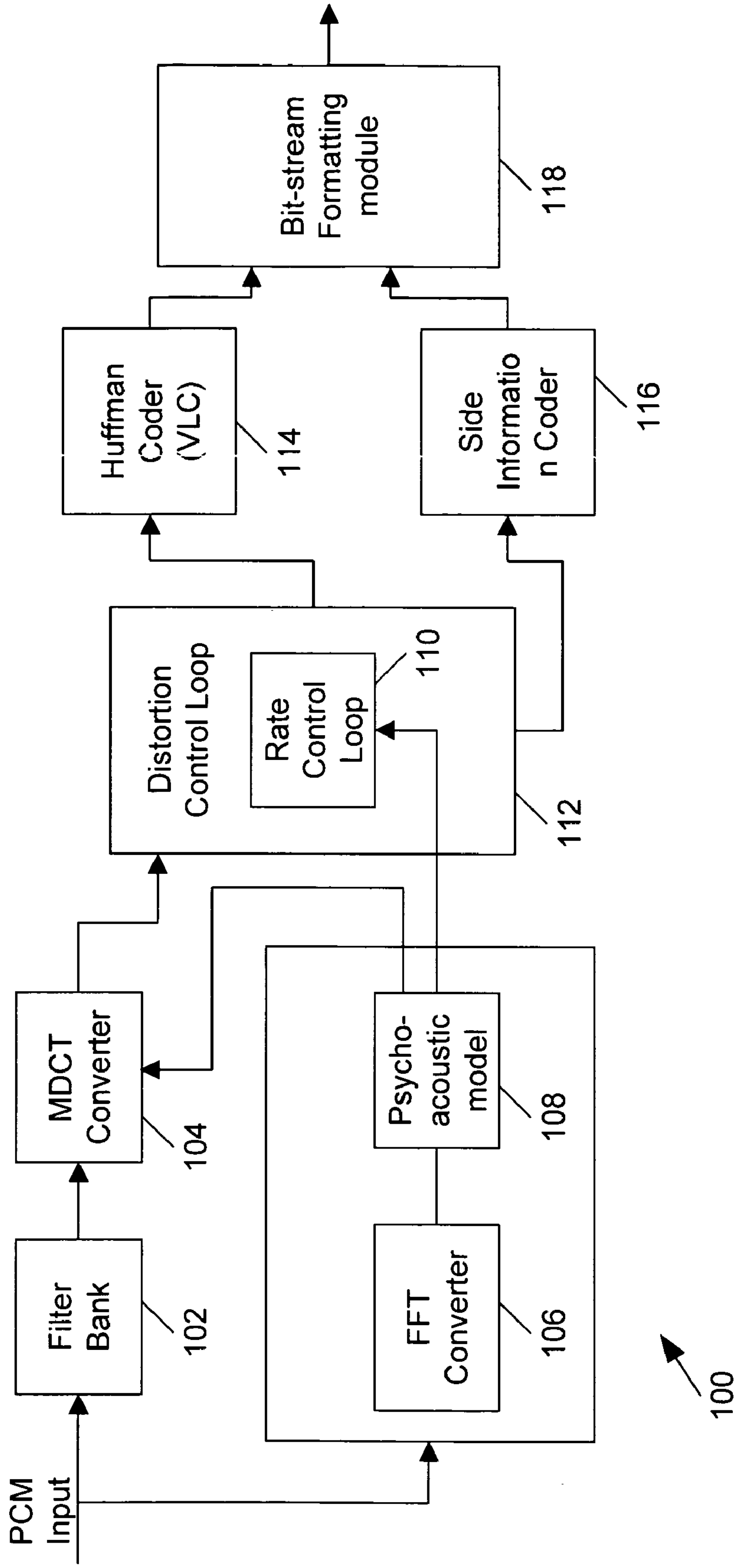
FIG. 1 illustrates a block diagram of an audio encoder on which the invention may be implemented, in accordance with an embodiment of the invention.

FIG. 1 illustrates an audio encoder 100 on which the invention may be implemented, in accordance with an embodiment of the invention. Audio encoder 100 comprises a filter bank 102 and a Modified Discrete Cosine Transform (MDCT) converter 104. In various embodiments of the invention, converters based on transforms such as Modified Discrete Sine Transform, Discrete Fourier Transform, and Discrete Cosine Transform may be used instead of MDCT converter 104. Filter bank 102 and MDCT converter 104 are used to convert the audio input, which is in the form of Pulse Code Modulated (PCM) signals, into frequency domain signals. These frequency domain signals are then divided into a number of frequency bands. The number of frequency bands depends on the encoder used. In an embodiment of the invention, the encoder may be a Moving Picture Experts Group (MPEG) Layer III encoder. This encoder also comprises a Fast Fourier Transform (FFT) converter 106 and a psycho-acoustic model 108. Psycho-acoustic model 108 is used to define a masking threshold of each of the frequency bands. The masking threshold is the minimum level of a signal that can be heard by a human ear in the particular frequency band. Audio encoder 100 removes portions of signals that are below the masking threshold.

Further, a coding algorithm is selected, based on the input signal. In various embodiments, the coding algorithm may be based on range encoding, arithmetic coding, unary coding, Fibonacci coding, Rice coding, or Huffman coding. In an embodiment of the invention, Huffman coding is used for coding the signals. A number of Huffman Tables are known, and one of them is selected, based on the input signals.

Audio encoder 100 also comprises a distortion control loop 112 and a rate control loop 110. Distortion control loop 112 shapes the quantization noise according to the masking threshold by defining the scale factors of each of the frequency bands. If the quantization noise in any band exceeds the masking threshold, distortion control loop 112 adjusts the scale factor to bring the quantization noise below the masking threshold. Rate control loop 110 is used to control the number of bits assigned to the coded information with the help of a global gain value. If the number of codes from the selected Huffman table exceeds the number of bits available, rate control loop 110 changes the global gain value. The process of scaling by rate control loop 110 and distortion control loop 112 results in the scaled input MDCT coefficients.

Therefore, if the input MDCT coefficients are expressed as c(i), the scaled input MDCT coefficients may be represented as:

$$c(i)*2^{Gscl*scl(sfb)}$$

where, Gscl is the global gain value defined by rate control loop 110, sfb is a scale factor band index, and scl(sfb) is a scale factor of a frequency band.

Thereafter, companding of the input MDCT coefficients is carried out after the optimum values of the scale factors and global gain are selected. The order of companding varies with the encoding algorithm. For example, in Moving Picture Experts Group (MPEG) Layer III encoding, the order of companding used is ¾. After this, quantization of the input MDCT coefficients is carried out. The input MDCT coefficients obtained after companding can be expressed as:

$$\{c(i)*A(sfb)\}^{3/4} \quad (1)$$

where the overall scaling factor, $A(sfb)=2^{Gscl*scl(sfb)}$

Also, audio encoder 100 comprises a Huffman coder 114, a side information coder 116, and a bit-stream formatting module 118. The companded input MDCT coefficients and the selected values of the coding algorithm, the scale factors, and the global gain are provided to Huffman coder 114, which encodes the companded input MDCT coefficients according to the selected algorithm. Therefore, using equation (1)

$$m(i)=int[\{c(i)*A(sfb)\}+0.5] \quad (2)$$

where m(i) are the scaled, companded and quantized values of the input MDCT coefficients, 0.5 is the average quantization error and the function into is used to convert a value to its nearest integer value.

Side information coder 116 is used to code the other information pertaining to the scaled input MDCT coefficients. In various embodiments of the invention, this other information may include the number of bits allocated to each of the frequency bands, the scale factors of each of the bands, and their global gain value.

Finally, the input MDCT coefficients encoded by Huffman coder 114, and the other information encoded by side information coder 116, are sent to a bit-stream formatting module 118, which performs various checks on both the input MDCT coefficients and the other information. In an embodiment of the invention, bit-stream formatting module 118 performs a cyclic redundancy check. The encoding of the audio signals is complete once the check is performed, and the encoded audio signals may be sent to a decoder.

In the decoder, the de-scaling and de-companding of m(i) is carried out to result in the audio signals cq(i), $$cq(i)=(m(i)^{4/3})/A(sfb) \quad (3)$$

The total error introduced by the process of encoding and decoding is defined as $$\begin{aligned} Q(i) &= c(i) - cq(i) \quad \text{(using equation (2))} \\ &= c(i) - (m(i)^{4/3})/A(sfb) \\ &= \{A(sfb)*c(i) - m(i)^{4/3}\}/A(sfb) \\ &= \{(A(sfb)c(i)^{3/4})^{4/3} - m(i)^{4/3}\}/A(sfb) \\ &\approx \{(m(i)-0.5)^{4/3} - m(i)^{4/3}\}/A(sfb) \end{aligned}$$

Using Taylor series expansion $(m(i)-0.5)^{4/3}$ can be expressed as:

$$(m(i)-0.5)^{4/3} \approx m(i)^{4/3} - 4/3*m(i)^{1/3}*0.5$$

Therefore, $$\begin{aligned} Q(i) &= -2/3*m(i)^{1/3}/A(sfb) \quad \text{(using equation (3))} \\ &= -2/3*((A(sfb)*cq(i))^{3/4})^{1/3}/A(sfb) \end{aligned}$$

The average error in a frequency band (Qa(sfb)) may be defined as $1/B(sfb)*\Sigma(Q(i))^2$, where B(sfb) is the bandwidth of the frequency band. Hence, Qa(sfb) may be expressed as, $$Qa(sfb)=(4/9)*[\Sigma\{cq(i)^{1/2}\}/\{B(sfb)*A(sfb)^{3/2}\}]$$

Further, to keep noise below the masking level, the masking threshold (M(sfb)) of the frequency band sfb should be equal to the average error in the frequency band (Qa(sfb)). Therefore, $$M(sfb)=(4/9)*[\Sigma\{cq(i)^{1/2}\}/\{B(sfb)*A(sfb)^{3/2}\}]$$

Rearranging the terms, we get the overall scaling factor $$A(sfb)=(4/9)^{2/3}*[\{\Sigma(c(i)^{1/2})\}^{2/3}/\{B(sfb)^{2/3}*M(sfb)^{2/3}\}]$$

Replacing the value of the overall scale factor from equation (1), we get:

$$2^{Gscl*scl(sfb)}=(4/9)^{2/3}*[\{\Sigma(c(i)^{1/2})\}^{2/3}/\{B(sfb)^{2/3}*M(sfb)^{2/3}\}] \quad (4)$$

According to an embodiment of the invention, equation (4) is used to calculate the scale factors of the different frequency bands. Further, a first variable f1 is defined as:

$$f1=\Sigma(c(i)^{1/2})$$

Therefore, equation (4) can be expressed as:

$$2^{Gscl*scl(sfb)}=(4/9)^{2/3}*[(f1)^{2/3}/\{B(sfb)^{2/3}*M(sfb)^{2/3}\}] \quad (5)$$

Initially, the global gain value can be assumed to be unity. This value may be changed in subsequent iterations, if required. Hence, the value of the scale factor is calculated, based on the formula derived in equation (5).

Figure 2:
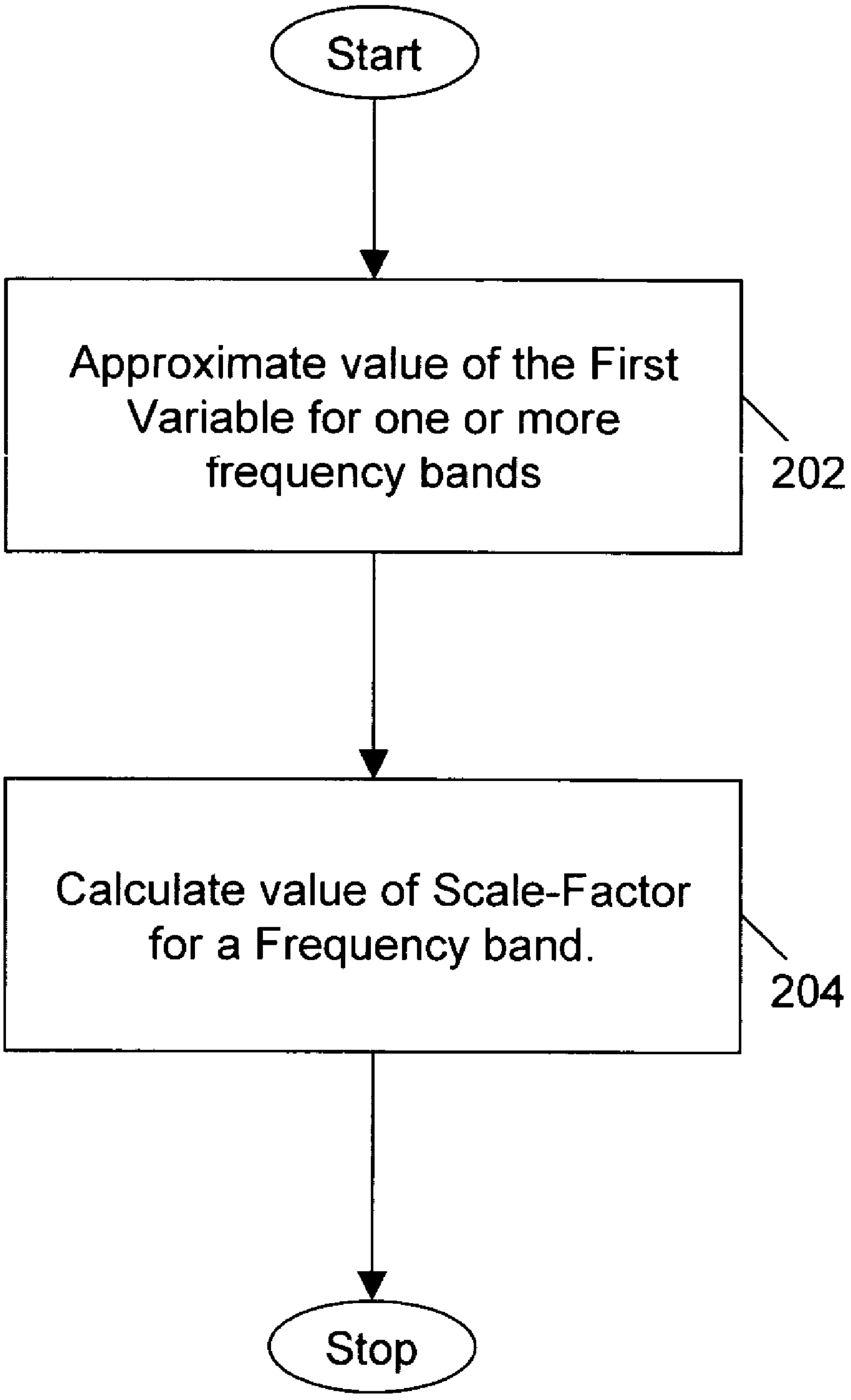
FIG. 2 is a flowchart illustrating a method in accordance with an embodiment of the invention.

FIG. 2 is a flowchart illustrating a method in accordance with an embodiment of the invention. As described earlier, distortion control loop 112 defines the scale factors of the different frequency bands. Further, these scale factors are dependant on the first variable, f1, which is defined as the summation of the square root of the MDCT coefficients. At step 202, the value of the first variable is approximated. The approximations are performed so that the complexity of the calculation of the scale factor is reduced. At step 204, the value of the scale factors is calculated by using the values of the approximated first variable. The masking thresholds of the various frequency bands are also used to calculate the same.

Figure 3:
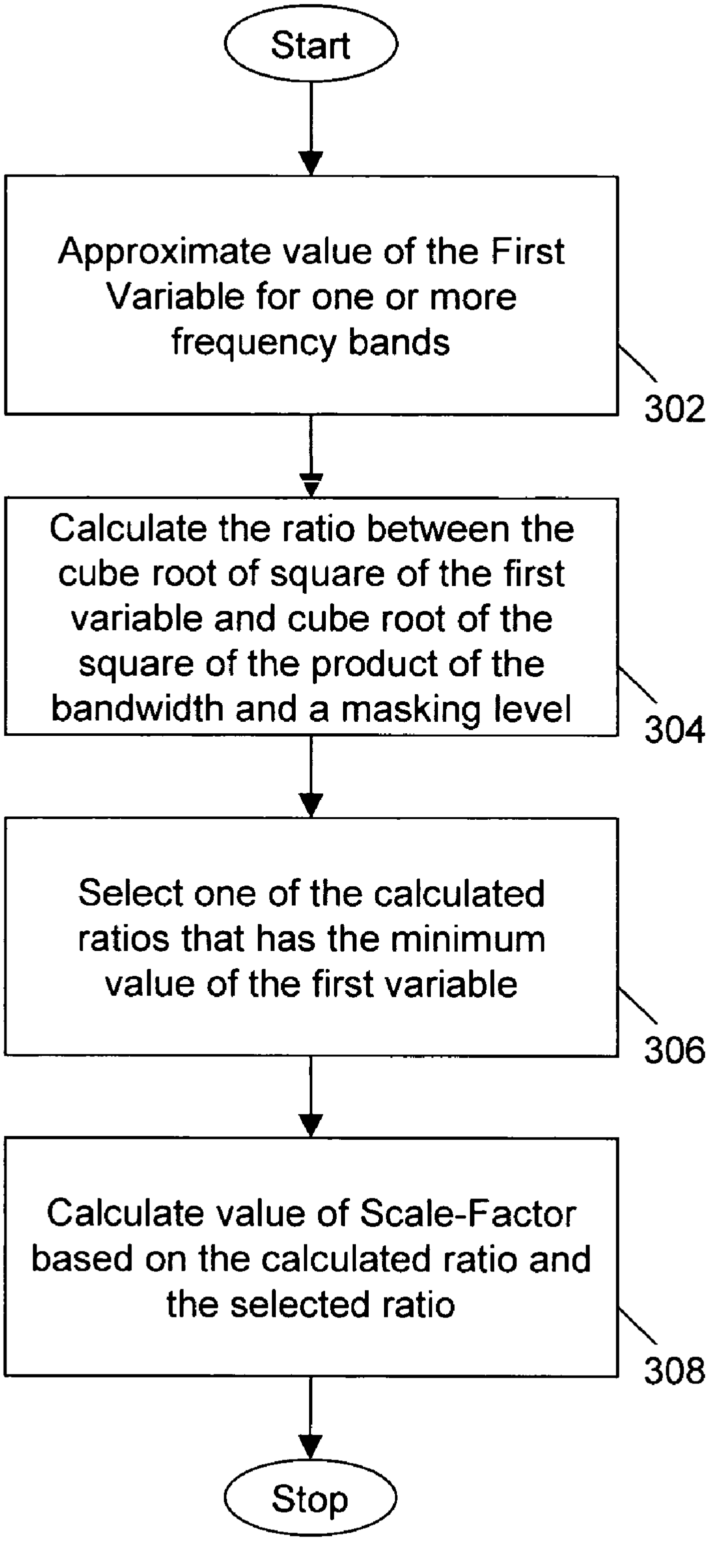
FIG. 3 is a detailed flowchart illustrating a method for the invention, in accordance with another embodiment of the invention.

FIG. 3 is a detailed flowchart illustrating a method for the invention, in accordance with another embodiment of the invention. At step 302, the value of the first variable, f1, is approximated. At step 304, a ratio between the cube root of the square of the approximated first variable and the cube root of the square of the product of the bandwidth and a masking level is calculated for one or more of the frequency bands. In a further embodiment, the ratio is calculated for all the frequency bands. At step 306, one of the calculated ratios, with the minimum value of the calculated first variable, is selected. The scale factor of the selected ratio is assumed to be zero. At step 308, the value of the scale factor of a frequency band is calculated, based on the calculated ratio of the frequency band and the selected ratio. According to an embodiment of the invention, the ratio of the calculated ratio and the selected ratio is calculated. Therefore, using equation (5):

$$2^{\{sclf(sfb)\}} \approx [[(f1)^{2/3}/\{B(sfb)^{2/3} * M(sfb)^{2/3}\}]]/[[(f1\min)^{2/3}/\{B(sfb\min)^{2/3} * M(sfb\min)^{2/3}\}]] \quad (6)$$

where f1min is the minimum value of the first variable, B(sfbmin) and M(sfbmin) are the bandwidth and the masking threshold of the frequency band corresponding to f1min, respectively. As mentioned earlier, the global gain, Gscl, is assumed to be unity.

According to another embodiment of the invention, the first variable can be approximated as the square root of the summation of the MDCT coefficients of the different frequency bands. Mathematically, this can be expressed as $$f1 = \Sigma(c(i)^{1/2}) = (\Sigma c(i))^{1/2}$$

Applying this value to equation (6), we get $$2^{\{sclf(sfb)\}} \approx [(\Sigma c(i))^{1/3}/\{B(sfb)^{2/3} * M(sfb)^{2/3}\}]/[(\Sigma c(i)\min)^{1/3}/\{B(sfb\min)^{2/3} * M(sfb\min)^{2/3}\}]$$

where, c(i)min are the values of the MDCT coefficients corresponding to the frequency band that has the minimum value of first variable, f1.

The above equation can also be expressed as $$2^{\{sclf(sfb)\}} \approx [(\Sigma c(i))/\{B(sfb)^2 * M(sfb)^2\}]^{1/3}/[(\Sigma c(i)\min)/\{B(sfb\min)^2 * M(sfb\min)^2\}]^{1/3}$$

Further defining two variables smr2(sfb) and smr2(sfbmin) as:

$$smr2(sfb) = [(\Sigma c(i))/\{B(sfb)^2 * M(sfb)^2\}], \text{ and}$$

$$smr2(sfb\min) = [(\Sigma c(i)\min)/\{B(sfb\min)^2 * M(sfb\min)^2\}]$$

the aforementioned equation can be expressed as $$2^{\{sclf(sfb)\}} = (smr2(sfb))^{1/3}/(smr2(sfb\min))^{1/3}$$

Further simplifying, we get $$2^{\{3*sclf(sfb)\}} = smr2(sfb)/smr2(sfb\min) \quad (7)$$

In an embodiment of the invention, taking logarithm on base 2, $$\begin{aligned} sclf(sfb) &= \log_2(smr2(sfb)/smr2(sfb\min))/3 \quad (8) \\ &= \{\log_2(smr2(sfb)) - \log_2(smr2(sfb\min))\}/3 \end{aligned}$$

In another embodiment, smr2(sfb) and smr2(sfbmin) are expressed in mantissa and exponent form as $smr2.m(sfb)^{smr2.e(sfb)}$ and $smr2.m(sfbmin)^{smr2.e(sfbmin)}$, respectively.

Therefore, $$sclf(sfb) = \{\log_2(smr2.m(sfb)^{smr2.e(sfb)}) - \log_2(smr2.m(sfb\min)^{smr2.(sfbmin)})\}/3$$

In yet another embodiment, smr2.m(sfb) and smr2.m(sfbmin) are equal to 2. Therefore, equation (8) may be expressed as $$sclf(sfb) = ((smr2.e(sfb)) - smr2.e(sfb\min))/3 \quad (9)$$

Figure 4:
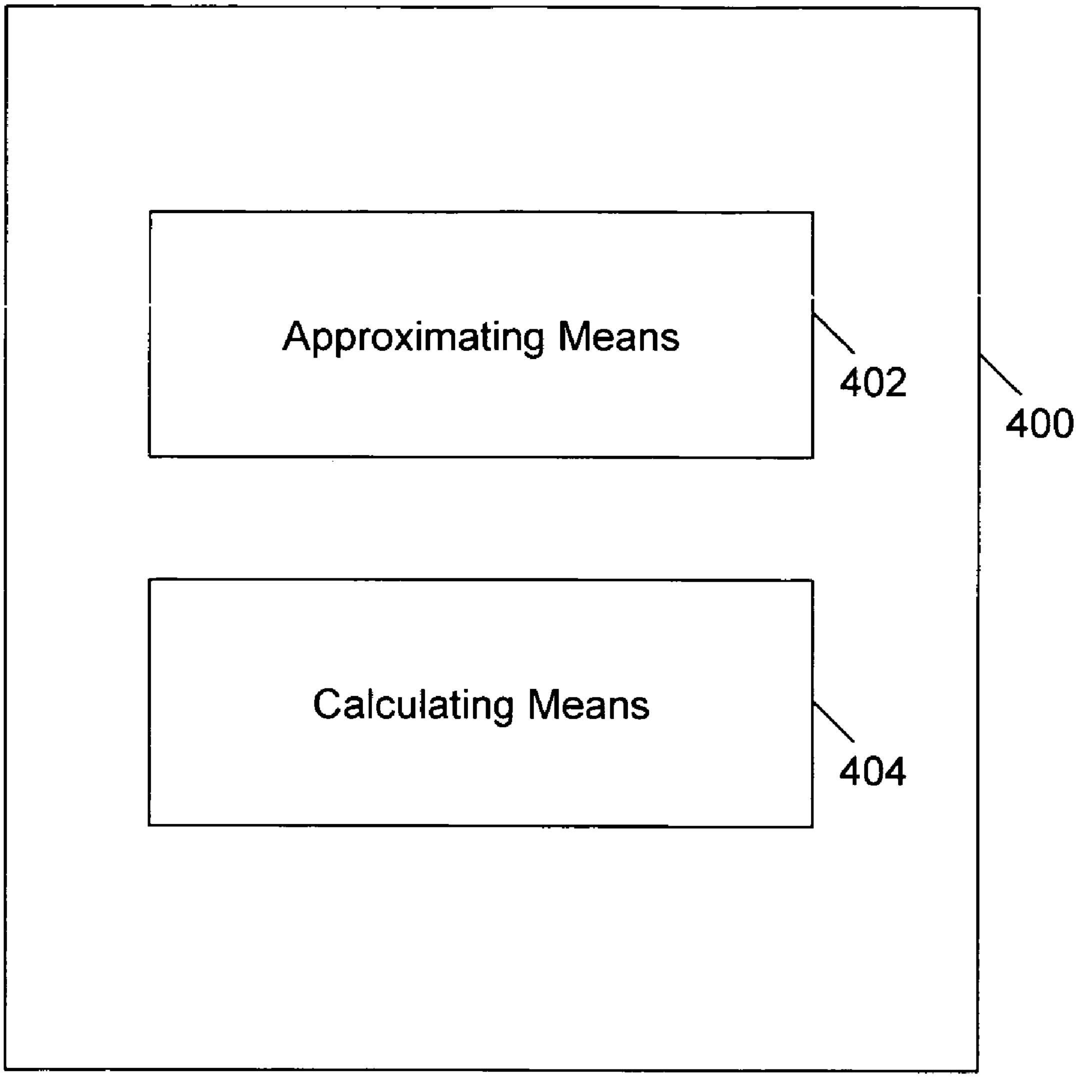
FIG. 4 is a block diagram of a system for the calculation of scale factors, in accordance with an embodiment of the invention.

FIG. 4 is a block diagram of a system 400 for the calculation of scale factors, in accordance with an embodiment of the invention. System 400 comprises an approximating means 402 and a calculating means 404. Approximating means 402 is used to approximate the value of the first variable, as described earlier. This value of the first variable is sent to calculating means 404. Calculating means 404 uses the approximated value of the first variable to calculate the values of the scale factors, also described earlier. In various embodiments of the invention, approximating means 402 and calculating means 404 are implemented on application-specific integrated circuits.

In another embodiment of the invention, the calculation of scale factors is carried out on a floating-point digital signal processor.

In another embodiment of the invention, a fixed-point digital signal processor, which can work on a pseudo floating-point algorithm with reduced accuracy, can be used for the calculation of the scale factor.

The quality of the audio signals produced by an audio encoder, incorporating an embodiment of the invention, can be checked with the help of an Objective Difference Grade (ODG). ODG provides the degradation of a signal with respect to a reference signal. ODG varies between 0 and −4, where the degree of degradation of the signal increases from 0 to −4. For example, if the ODG is 0, there is an imperceptible degradation in the signal. Similarly, if the ODG is −4, there is a large degradation in the signal with respect to the reference signal.

FIG. 5 is a comparison of Objective Difference Grade (ODG) results of the different audio signals produced by a conventional encoder, and those produced by an encoder implementing an embodiment of the invention for various input signals, in accordance with an embodiment of the invention. Table 1 of FIG. 5 illustrates the ODG results when the encoders are used in a joint stereo with a sampling frequency of 44.1 kHz, and a bit rate of 128 kbps. Table 2 of FIG. 5 illustrates the ODG results when the encoders are used in a stereo with a sampling frequency of 44.1 kHz, and a bit rate of 128 kbps. The ODG results of FIG. 5 illustrate that, by using the embodiments of the invention, the quality of the signal is maintained with respect to the algorithm of the conventional encoder.

The embodiments of the invention have the advantage that the complexity of the calculation of the scale factors reduces to one-tenth of the earlier methods of calculation. This enables faster and more efficient calculation. Further, this helps in simpler implementation on a floating-point or a fixed-point digital signal processor.

Although the invention has been discussed with respect to specific embodiments thereof, these embodiments are merely illustrative, and not restrictive, of the invention.

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Reference throughout this specification to "one embodiment", "an embodiment", or "a specific embodiment" means that a particular feature, structure, or characteristic described in connection with the embodiment is included in at least one embodiment of the invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the invention may be combined in any suitable manner with one or more other embodiments. It is to be understood that other variations and modifications of the embodiments of the invention, described and illustrated herein, are possible in light of the teachings herein and are to be considered as part of the spirit and scope of the invention.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Embodiments of the invention may be implemented by using a programmed general purpose digital computer, by using application specific integrated circuits, programmable logic devices, field programmable gate arrays, optical, chemical, biological, quantum or nano-engineered systems, components and mechanisms may be used. In general, the functions of the invention can be achieved by any means as is known in the art. Distributed, or networked systems, components and circuits can be used. Communication, or transfer, of data may be wired, wireless, or by any other means.

A "machine-readable medium" for purposes of embodiments of the invention may be any medium that can contain, store, communicate, propagate, or transport the program for use by or in connection with the instruction execution system, apparatus, system or device. The machine-readable medium can be, by way of example only but not by limitation, an electronic, magnetic, optical, electromagnetic, infrared, or semiconductor system, apparatus, system, device, propagation medium, or computer memory.

Any suitable programming language can be used to implement the routines of the invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multipie steps shown as sequential in this specification can be performed at the same time. The sequence of operations described herein can be interrupted, suspended, or otherwise controlled by another process, such as Digital Signal Processing etc. The routines can operate in audio encoding environment or as stand-alone routines occupying all, or a substantial part, of the system processing.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

What is claimed is:

1. A method for estimating scale-factors for an input signal in an audio encoder, scale-factors being calculated for one or more frequency bands of the input signal, the scale-factors being dependant on a plurality of variables, a first variable being the summation of the square roots of the coefficients of the Fourier transform of a frequency band, the method comprising the steps of: a. approximating the value of a first variable for the one or more frequency bands using a signal processor; and b. calculating the value of the scale-factor for a frequency band by using the approximated value of the first variable.

2. The method according to claim 1, wherein the first variable is the summation of the square root of the MDCT coefficients of a frequency band.

3. The method according to claim 1, wherein the step of approximating comprises approximating the first variable as the square root of the summation of the coefficients of the Fourier transform of the frequency band.

4. The method according to claim 1, wherein the step of calculating the value of the scale-factor further comprises the steps of: a. calculating the ratio between the cube root of the square of the first variable and the cube root of the square of the product of the bandwidth and a masking level for each of the one or more frequency bands, and b. selecting a ratio that has the minimum value of the first variable.

5. The method according to claim 4, wherein the step of calculating the value of the scale-factor comprises calculating the scale-factor based on the values of the ratio for the frequency band and the selected ratio.

6. The method according to claim 5, wherein the step of calculating the value of the scale-factor comprises calculating the difference between the logarithm in base 2 of the ratio of the frequency band, and the logarithm in base 2 of the selected ratio.

7. The method according to claim 5, wherein the step of calculating the value of the scale-factor comprises calculating the difference of the exponent of the ratio of the frequency band and the exponent of the selected ratio.

8. The method according to claim 1, wherein the step of calculating the value of scale-factor is carried out on a fixed-point digital signal processor.

9. The method according to claim 1, wherein the step of calculating the value of the scale-factor is carried out on a floating-point digital signal processor.

10. A method for estimating scale-factors for an input signal in an audio encoder, scale-factors being calculated for one or more frequency bands of the input signal, scale-factors being dependant on a plurality of variables, a first variable being the summation of the square roots of the coefficients of the Fourier transform of a frequency band, the method comprising the steps of: a. approximating the value of a first variable for the one or more frequency bands using a signal processor; b. calculating the ratio between the cube root of the square of the first variable and the cube root of the square of the product of the bandwidth and a masking level for each of the one or more frequency bands; c. selecting one of the calculated ratios that has the minimum value of the first variable; and d. calculating the value of the scale-factor for a frequency band by using the value of the calculated ratio of the frequency band and selected value of the calculated ratio.

11. The method according to claim 10, wherein the first variable is the summation of the square root of the MDCT coefficients of a frequency band.

12. The method according to claim 10, wherein the step of approximating comprises approximating the first variable as the square root of the summation of the coefficients of the Fourier transform of the frequency band.

13. The method according to claim 10, wherein the step of calculating the value of the scale-factor comprises calculating the difference between the logarithm in base 2 of the ratio of the frequency band, and the logarithm in base 2 of the selected ratio.

14. The method according to claim 10, wherein the step of calculating the value of the scale-factor comprises calculating the difference of the exponent of the ratio of the frequency band and the exponent of the selected ratio.

15. An audio encoder system for estimating scale-factors for an input signal, scale-factors being calculated for one or more frequency bands of the input signal, the scale-factors being dependant on a plurality of variables, a first variable being the summation of the square roots of the coefficients of a Fourier transform of a frequency band, the system comprising: a. approximating means for approximating the value of a first variable for the one or more frequency bands; and b. calculating means for calculating the value of scale-factor for a frequency band by using the approximated value of the first variable.

16. The audio encoder system according to claim 15, further comprising a floating-point digital signal processor.

17. The audio encoder system according to claim 15, further comprising a fixed-point digital signal processor.

18. A computer program product recorded in a computer readable medium for estimating scale-factors for an input signal, scale-factors being calculated for one or more frequency bands of the input signal, scale-factors being dependant on a plurality of variables, a first variable being the summation of the square roots of the coefficients of the Fourier transform of a frequency band, the computer program product comprising a computer readable medium comprising: a. program instruction means for approximating the value of a first variable for the one or more frequency bands; and b. program instruction means for calculating the value of scale-factor for a frequency band by using the approximated the first variable.

19. The computer program product according to claim 18, wherein the program instruction means for approximating comprises program instruction means for approximating the first variable as the square root of the summation of the coefficients of the Fourier transform of the frequency band.

20. The computer program product according to claim 18, wherein the program instruction means for calculating the value of the scale-factor further comprises: a. program instruction means for calculating the ratio between the cube root of the square of the first variable and the cube root of the square of the product of the bandwidth and a masking level for each of the one or more frequency bands, and b. program instruction means for selecting a ratio that has the minimum value of the first variable.

* * * * *